(12) United States Patent
Auman

(10) Patent No.: US 12,383,849 B2
(45) Date of Patent: Aug. 12, 2025

(54) METHOD FOR MANUFACTURING FILTER PLATES WASTEWATER FILTER ASSEMBLIES

(71) Applicant: OVIVO INC., Montreal (CA)

(72) Inventor: Trevor Robert Auman, Sandy, UT (US)

(73) Assignee: Ovivo Inc., Montreal (CA)

( * ) Notice: Subject to any disclaimer, the term of this patent is extended or adjusted under 35 U.S.C. 154(b) by 485 days.

(21) Appl. No.: 17/947,613

(22) Filed: Sep. 19, 2022

(65) Prior Publication Data

US 2024/0091677 A1   Mar. 21, 2024

(51) Int. Cl.
*B01D 24/00* (2006.01)
*B01D 39/20* (2006.01)

(52) U.S. Cl.
CPC ....... *B01D 24/001* (2013.01); *B01D 39/2086* (2013.01); *B01D 2101/02* (2013.01); *B01D 2239/10* (2013.01)

(58) Field of Classification Search
None
See application file for complete search history.

(56) References Cited

U.S. PATENT DOCUMENTS 5,989,420 A     11/1999  Sugimoto
2007/0107395 A1*  5/2007  Zuberi .............. B01D 46/0001
                                                      55/523

* cited by examiner

*Primary Examiner* — Yung-Sheng M Tsui
(74) *Attorney, Agent, or Firm* — Thomas M. Freiburger

(57) ABSTRACT

A method for manufacturing wastewater filtration plates uses a flowable composition including pre-ceramic raw material. The flowable composition is extruded to form a thin plate preform. Carbon-containing material is included in the flowable composition and/or added to the surface of the thin plate perform during or after extrusion thereof. The carbon-containing material is preformed carbon filaments or carbon-fiber precursor material. The thin plate preform is subjected to elevated temperatures to convert the pre-ceramic raw material into porous ceramic with carbon filaments embedded therein or disposed on the surface of the finished ceramic plate.

11 Claims, 1 Drawing Sheet

METHOD FOR MANUFACTURING FILTER PLATES WASTEWATER FILTER ASSEMBLIES

BACKGROUND OF THE INVENTION

The present invention relates to modular filter plate assemblies for wastewater and water treatment applications. Specifically, the invention relates to a method for manufacturing filter plates that are disposed in parallel in filter modules or casings stacked for wastewater and water treatment.

Typical filter assemblies that are lowered into wastewater treatment tanks include a basic frame/box and an integrated header holding SiC membrane filter plates disposed in modular casings. The modular casings key into each other with male-female coupling and with an interposed gasket. To remove a module the stack has to be slightly lifted. Once the stack is lifted a little the module can be lifted and pulled out laterally. Alternately a set of modules could be removed from the top.

The stacked modules of these box-type modular filter assemblies have aligned holes for tie rods to be inserted down from the top. In some versions these rods can be seen from the outside, while in other versions the rods are enclosed in their entireties in the module body itself.

The filter plates are typically made of porous silicon-carbide (SiC) ceramic material. Ceramics, particularly including SiC, are brittle by nature, very strong, but brittle. The long slender shape of the SiC membrane plates renders them susceptible to breakage. Making the plates thicker to increase their resistance to facture reduces the filtration area (the outer surface of the membrane) per volume. The density of filtration area lessens and the amount of material increases, reducing the efficiency of filtration and likely increasing manufacturing costs. Manufacturing an SiC membrane plate requires a high sintering temperature, and many additives that might reinforce the material will not survive the manufacturing process or will be detrimental to the final SiC structure.

In many applications using SiC a variety of materials can be added, but in many such applications the SiC article is compressed or molded so that the ceramic has a very dense final grain structure. Additives may not have the same ability to move within the substrate. With SiC membranes the grain structure is very open so as to allow matter and gases to move around. In addition, at the high sintering temperatures much of the material is burned away. Moreover, adding pre-manufactured material to the mixture adds additional cost as the carbon fiber (CF) has already been through a furnace and will undergo another heating process without adding value.

SiC material for membranous filter plates of water treatment assemblies would benefit from reinforcement, especially that manages the tensile strength of the entire composition to increase toughness. The material used for SiC filtration membranes is a low density SiC grain structure created through an extruding process. The green forms are subjected to various de-binding and sintering processes to produce the final SiC membrane component. As mentioned above the heating process involves very high temperatures and most additives do not survive the manufacturing process or else change the SiC matrix so as to weaken the structure either mechanically, chemically or otherwise.

SUMMARY OF THE INVENTION

One additive that survives a filter-plate manufacturing process is carbon fiber as it is produced at the same high temperatures. Adding chopped carbon fiber to an extrusion mixture for forming wastewater filtration plates results in the carbon fiber surviving the process and increasing the strength of the plates, without increasing the thickness of the plates.

Accordingly, a method for manufacturing filter plates for water treatment comprises, pursuant to the present invention, (a) providing a flowable composition including pre-ceramic raw material and pre-formed filaments, preferably carbon and/or ceramic filaments, most preferably only carbon filaments, (b) extruding the flowable composition to form a thin plate preform, and (c) subjecting the thin plate preform to elevated temperatures to convert the pre-ceramic raw material into porous ceramic with the filaments embedded therein. The filaments can take the form of fibers or whiskers. In the case of carbon, the fibers typically include multiple crystals of various alignments coupled to one another in elongate strands, while whiskers are typically mono-crystalline of a single crystal orientation.

The present invention contemplates that the extrudable pre-ceramic composition may include not carbon filaments per se but rather carboniferous raw material that results in carbon filaments upon sufficient heating. The carbon-containing precursor material included in the pre-ceramic composition or mixture for extrusion and sintering undergoes the processes of (a) organic component separation, de-binding and elimination and (b) carbon concatenation to generate carbon filaments (fiber and/or whiskers) as the ceramic pre-form composition moves through the production (de-binding and sintering) of a SiC filter plate. This allows the end net result to be the same, but significant cost savings can be found as the carbon-containing raw material has been added without having already expended the energy to produce fully manufactured carbon fiber and/or whiskers.

Thus, a preferred method for manufacturing filter plates for water treatment comprises, pursuant to the present invention, providing a flowable composition including pre-ceramic raw material and carbon-containing precursor material, extruding the flowable composition to form a thin plate preform, subjecting the thin plate preform to elevated temperatures to convert the pre-ceramic raw material into porous ceramic, and generating carbon filaments (fibers and/or whiskers) from the carbon-containing precursor material by virtue of the subjecting of the thin plate preform to elevated temperatures, the carbon fibers and/or whiskers being embedded in the porous ceramic.

The carbon filament precursor included in the raw composition for extruding filter plate preforms pursuant to the present invention may be a carbon heavy material such as rayon. Other suitable carbon filament precursors include PAN (polyacrylonitrile) and pitch. The rayon is de-bound and sintered during post extrusion high-temperature processing, resulting in the long carbon chains that make up carbon filaments. The organics are burned away.

In a conventional SiC manufacturing process, an organic filler included in the raw extrusion material used creates the porous SiC structure after be-dinging and sintering. By adding rayon or another carbon-fiber precursor material to the extrusion mixture, the carbon filament chains will form in the SiC grain structure and provide increased tensile strength to the extruded wastewater filtration plates. Carbon fiber and whiskers can handle exceptionally high tensile loads.

As the raw pre-ceramic mixture is extruded, the carbon-containing raw material (or pre-manufactured carbon and/or ceramic fibers) tends to align in the extrusion direction as the mixture moves through the extruder and the die. This advantageously increases tensile strength in the length direction of the filtration plates, ideal for a long slender plate.

Carbon and/or ceramic filaments and/or carbon-containing raw material is included in the extrudable pre-firing mixture in an amount of 1% to 10% by weight, and preferably, 2%-5%.

The carbon and/or ceramic filaments add tensile strength to a primarily SiC structure. While the strength-lending material may be initially added as pre-manufactured carbon and/or ceramic filaments, preferably filament-forming material is added to the extrudable mixture in a precursor form. In that case, the final SiC ceramic filtration plates likely include filaments aligned in the most beneficial direction (the length) of the geometry. Moreover, the filaments and the SiC ceramic matrix more likely connect to one another with a strong bond when the filaments form in the extruded preforms of the filtration plates. The raw material form of carbon for generating filaments is much less expensive than the fully manufactured filaments and, again, the SiC manufacturing process will result in fully formed carbon filaments linked to the SiC sintered grain structure. Carbon fiber especially is naturally very inert and not likely to react with a variety of chemicals used in membrane filtration.

DETAILED DESCRIPTION

Figure 1:
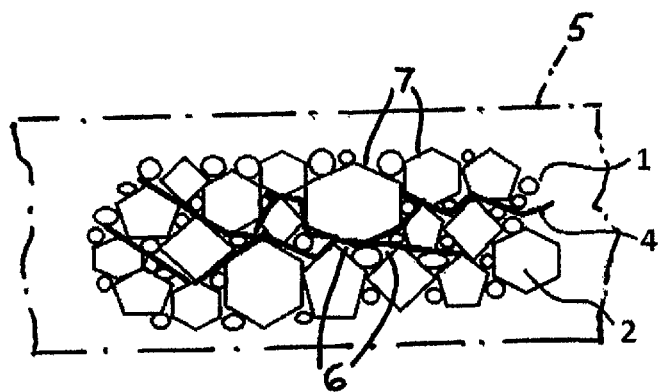
FIG. 1 is a schematic cross-sectional view, on an enlarged scale, of internal structure of an extruded filtration plate preform pursuant to the present invention, prior to high-temperature treatment.
Figure 2:
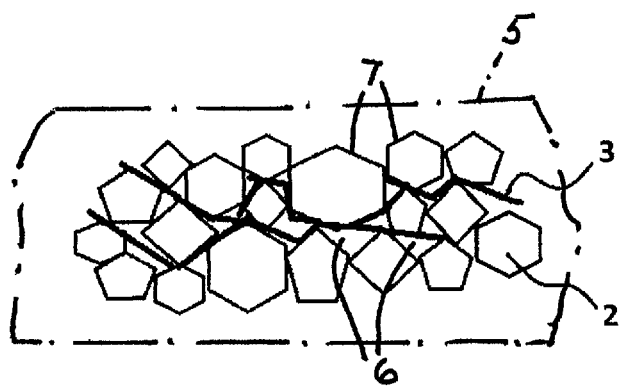
FIG. 2 is a schematic cross-sectional view similar to FIG. 1, showing a filtration plate material after sintering and de-binding and removal of organics.

A method for manufacturing thin filter plates for stacked modular containment casings of wastewater treatment assemblies starts with a flowable composition including pre-ceramic raw material. The flowable composition further includes preformed carbon and/or ceramic filaments 3 (FIG. 2) or filament-forming precursor material 4 (FIG. 1). The flowable composition is extruded to form a thin plate preform 5 which is then subjected to elevated temperatures, well known in the art, to convert the pre-ceramic raw material into porous ceramic 2 with carbon and/or ceramic filaments 3 embedded therein. The filaments 3 can take the form of fibers and/or whiskers. In the case of carbon, fibers typically include multiple crystals of various alignments coupled to one another in elongate strands, while whiskers are typically threads of mono-crystalline carbon with a single crystal orientation. Ceramic filaments may be composed of alumina.

Where the pre-ceramic raw material includes preformed carbon and/or ceramic filaments 3, the filaments remain intact during the extrusion and subsequent firing process but are embedded within the porous ceramic material 2. During the extrusion process, the carbon and ceramic filaments generally orient themselves longitudinally, that is, in the direction of the extrusion. In the final product, where plate-shaped preforms 5 are sintered into a rigid or hardened state, filaments 3 weave interstitially through pores 6 between granules 7 (typically SiC granules) of the ceramic material 2. Filaments 3 increase the strength of the filter plates, without increasing the thickness of the plates.

Where the carbon of the carbon filaments 3 of the final product is initially in the form of carbon-containing precursor material 4, the ceramic firing process converts the precursor material 4 into carbon fibers or whiskers 3. The carbon-containing precursor material 4 added to the mixture for extrusion and sintering undergoes (a) organic component separation, de-binding and elimination and (b) carbon concatenation to generate carbon filaments 3 as the ceramic pre-form composition moves through the production (de-binding and sintering) of a filter plate preform 5 hardened into final form. This process attains the same net end result, but introduces significant cost savings as the carbon-containing raw material 4 has been added without having already expended the energy to produce fully manufactured carbon filaments 3.

Thus, in a preferred method for manufacturing filter plates for water treatment, one provides a flowable composition that includes pre-ceramic raw material and filament-forming precursor material 4. The flowable composition is extruded to form a thin plate preform 5, which one subjects to elevated temperatures to convert the pre-ceramic raw material into porous ceramic 2. Filaments 3 are generated from the precursor material 4 by or during the heating of the thin plate preform 5 to elevated temperatures. The generated filaments 3 become embedded in the porous ceramic 2.

The flowing of the flowable composition during the extrusion process tends to guide the filament-forming precursor material 4 in the flowable composition into linear configurations, so that the filaments 3 generated in the fired filter plates from the extruded preforms 5 extend generally in a common direction in the porous ceramic 2.

The precursor material 4 included in the flowable composition that is extruded into filter plate preforms 5 may be a carbon heavy material such as rayon. The rayon is de-bound and sintered during post extrusion high-temperature processing, resulting in the long carbon chains that make up carbon fiber and/or whiskers 3. The organics are burned away. Other suitable carbon filament precursors include PAN (polyacrylonitrile) and pitch.

The flowable composition extruded to form filter-plate preform 5 typically includes an organic filler to create pores 6 in the porous SiC ceramic structure 2 after be-dinging and sintering. Rayon or another carbon-containing precursor material 4 in the flowable composition or extrusion mixture results in the chains or threads of carbon 3 formed in the SiC grain structure (FIG. 2) and provides increased tensile strength to the finished wastewater filtration plates.

Carbon or ceramic filaments 3 or filament-forming raw material 4 is included in the extrudable pre-firing mixture in an amount of 1% to 10% by weight, and preferably, 2%-5%.

As indicated above, as the raw pre-ceramic flowable mixture is extruded, the filament-forming precursor material 4 (as well as the fully manufactured filaments 3) tends to align in the extrusion direction as the mixture moves through the extruder and the die. This advantageously increases tensile strength in the length direction of the filtration plates, ideal for a long slender plate. The filaments 3 and the SiC ceramic matrix 2 more likely connect to one another with a strong bond when the filaments 3 form in the extruded preforms 5 of the filtration plates. The raw material form 4 of filaments 3 is much less expensive than the fully manufactured filaments and, again, the SiC manufacturing process will result in fully formed filaments 3 linked to the SiC sintered grain structure 2.

Figure 3:
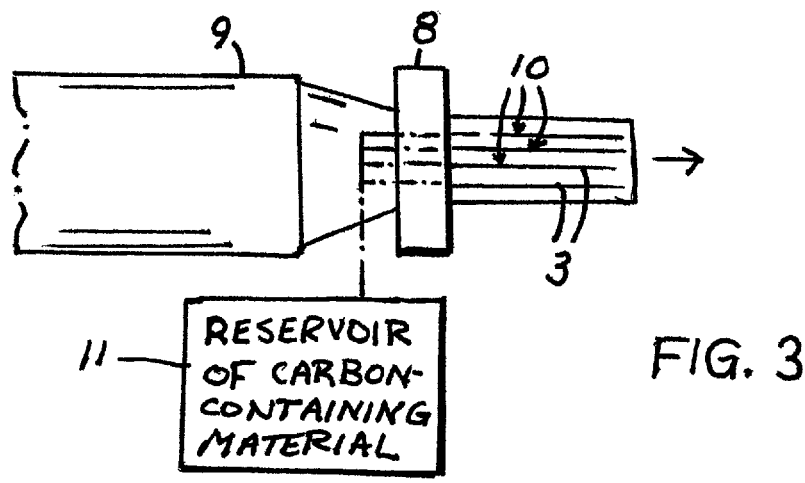
FIG. 3 is a schematic elevational view of an extrusion process pursuant to the present invention for producing a wastewater filtration plate.

In a related method for producing wastewater filtration plates, carbon and/or ceramic filaments 3 and/or filament-forming precursor material 4 is added to the exterior of an extruded plate preform 5'. Either precursor material or continuous strands (fibers or whiskers) may be deposited as the flowable pre-ceramic material is extruded through a die 8 by an extruder 9 (FIG. 3), to generate linear arrays 10 of filamentary material 3 in a finished, sintered product. The precursor material or continuous strands (fibers and/or whiskers) are fed from a reservoir 11 to die 8.

Although the invention has been described in terms of particular embodiments and applications, one of ordinary skill in the art, in light of this teaching, can generate additional embodiments and modifications without departing from the spirit of or exceeding the scope of the claimed invention. It is to be noted that product may be manufactured using various combinations of processes, for instance, the flowable composition may include filament-forming precursor material and/or pre-formed filaments of carbon and/or ceramic, while filament-forming precursor material and/or pre-formed filaments of carbon and/or ceramic may be added to the surface of the extruded material during or after extrusion. Accordingly, it is to be understood that the drawings and descriptions herein are proffered by way of example to facilitate comprehension of the invention and should not be construed to limit the scope thereof.

What is claimed is:

1. A method for manufacturing filter plates for water treatment, comprising:
   providing a flowable composition including pre-ceramic raw material and carbon-containing precursor material;
   extruding the flowable composition to form a thin plate preform;
   subjecting the thin plate preform to elevated temperatures to convert the pre-ceramic raw material into porous ceramic; and
   generating carbon filaments from the carbon-containing precursor material by virtue of the subjecting of the thin plate preform to elevated temperatures, the carbon filaments being embedded in the porous ceramic.

2. The method defined in claim 1, further comprising guiding carbon-containing precursor material in the flowable composition into linear patterns during the extruding of the flowable composition, the generated carbon filaments extending generally in a common direction in the porous ceramic.

3. A method for manufacturing filter plates for water treatment, comprising:
   providing a flowable composition including pre-ceramic raw material and pre-formed filaments;
   extruding the flowable composition to form a thin plate preform; and
   subjecting the thin plate preform to elevated temperatures to convert the pre-ceramic raw material into porous ceramic with the filaments embedded therein.

4. The method defined in claim 3, further comprising guiding the filaments in the flowable composition into linear patterns during the extruding of the flowable composition, the filaments extending generally in a common direction in the porous ceramic.

5. The method defined in claim 4 wherein the filaments are carbon filaments.

6. The method defined in claim 3 wherein the filaments are carbon filaments.

7. A method for manufacturing filter plates for water treatment, comprising:
   providing a flowable composition including pre-ceramic raw material;
   extruding the flowable composition to form a thin plate preform;
   during or after the extruding of the flowable composition, adding carbon-containing material to the exterior of the extruded form; and
   subjecting the thin plate preform to elevated temperatures to convert the pre-ceramic raw material into porous ceramic and the carbon-containing material into carbon filaments attached to the porous ceramic.

8. The method defined in claim 7 wherein the adding of the carbon-containing material includes adding continuous strands of carbon.

9. The method defined in claim 7 wherein the adding of the carbon-containing material includes adding carbon-containing precursor material.

10. A method for manufacturing filter plates for water treatment, comprising:
    providing a flowable composition including pre-ceramic raw material;
    extruding the flowable composition to form a thin plate preform;
    during or after the extruding of the flowable composition, adding filaments to the exterior of the extruded form; and
    subjecting the thin plate preform to elevated temperatures to convert the pre-ceramic raw material into porous ceramic with the filaments attached thereto.

11. The method defined in claim 10 wherein the filaments are carbon filaments.

\* \* \* \* \*